(12) United States Patent
Marakkannu et al.

(10) Patent No.: US 9,799,208 B2
(45) Date of Patent: Oct. 24, 2017

(54) PHYSICAL AND LOGICAL THREAT ANALYSIS IN ACCESS CONTROL SYSTEMS USING BIM

(71) Applicant: Honeywell International Inc., Morristown, NJ (US)

(72) Inventors: Sakthi Prakash Marakkannu, Madurai (IN); Balaji Bhathey Sivakumar, Madurai (IN); Vibgy Joseph, Tirunelveli (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/524,175

(22) Filed: Oct. 27, 2014

(65) Prior Publication Data
US 2016/0117917 A1    Apr. 28, 2016

(51) Int. Cl.
| | |
|---|---|
| *G08B 29/00* | (2006.01) |
| *G08B 29/18* | (2006.01) |
| *G08B 29/12* | (2006.01) |
| *G06Q 10/00* | (2012.01) |
| *G06Q 50/26* | (2012.01) |

(52) U.S. Cl.
CPC .......... *G08B 29/185* (2013.01); *G06Q 10/00* (2013.01); *G06Q 50/265* (2013.01); *G08B 29/12* (2013.01)

(58) Field of Classification Search
CPC ...... G06Q 10/10; G06Q 50/265; G08B 29/12; G08B 29/185
See application file for complete search history.

(56) References Cited

U.S. PATENT DOCUMENTS

| | | | |
|---|---|---|---|
| 7,130,779 B2 | 10/2006 | Beverina et al. | |
| 7,933,989 B1* | 4/2011 | Barker | H04L 12/2602 709/223 |
| 2001/0027389 A1* | 10/2001 | Beverina | G06Q 20/203 703/22 |
| 2004/0189471 A1* | 9/2004 | Ciarcia, Jr. | G07C 9/00111 340/572.1 |
| 2006/0102717 A1* | 5/2006 | Wood | G06Q 10/10 235/382 |
| 2008/0106368 A1* | 5/2008 | Vitier | E04H 3/06 340/5.5 |
| 2009/0261969 A1* | 10/2009 | Kobayashi | B60R 25/102 340/539.11 |
| 2012/0262270 A1 | 10/2012 | McNally | |

(Continued)

FOREIGN PATENT DOCUMENTS

GB        2475959 A     6/2011

OTHER PUBLICATIONS

Extended European search report from corresponding EP patent application 15191471.0, dated Feb. 25, 2016.

*Primary Examiner* — Sam K Ahn
*Assistant Examiner* — Fabricio R Murillo Garcia
(74) *Attorney, Agent, or Firm* — Husch Blackwell LLP (57) ABSTRACT

An apparatus including a building information model (BIM) of a secured area having a plurality of different portions, the BIM embodied in a memory, a processor that identifies portions of the secured area having different levels of security and a processor that alerts a user of a security weakness based upon an interaction between the security levels and physical characteristics of the secured area defined by the BIM.

17 Claims, 6 Drawing Sheets

(56) References Cited

U.S. PATENT DOCUMENTS

| | | | |
|---|---|---|---|
| 2013/0227696 A1* | 8/2013 | Young | G06F 21/577 726/25 |
| 2013/0307682 A1 | 11/2013 | Jerhotova et al. | |
| 2014/0164072 A1* | 6/2014 | Kulusjarvi | G06F 17/5004 705/7.39 |
| 2014/0306799 A1* | 10/2014 | Ricci | B60Q 1/00 340/5.83 |
| 2015/0161882 A1* | 6/2015 | Lett | G08B 25/001 340/506 |

* cited by examiner

PHYSICAL AND LOGICAL THREAT ANALYSIS IN ACCESS CONTROL SYSTEMS USING BIM

FIELD

This application relates to security systems and more particular to the configuration of such systems.

BACKGROUND

Systems are known to protect people and assets within secured areas. Such systems are typically based upon the use of one more sensors that detect threats within the secured area.

Threats to people and assets may originate from any of number of different sources. For example, a fire may kill or injure occupants who become trapped by a fire in a home. Similarly, carbon monoxide from a fire may kill people in their sleep.

Alternatively, an unauthorized intruder, such as a burglar may present a threat to assets within a secured area. Intruders have also been known to injure or kill people living within the area.

In the case of intruders, sensors may be placed and used in different areas based upon the different uses of the secured space. For example, if people are present within some portions of a normal day and not at other times, then some sensors may be placed along a periphery of the space to provide protection while the space is occupied while additional sensors may be placed and used within an interior of the space when the space is not occupied.

In most cases, threat detectors are connected to a local control panel. In the event of a threat detected via one of the sensors, the control panel may sound a local audible alarm. The control panel may also send a signal to a central monitoring station.

While security system work well, they are sometimes difficult to set up and use, especially when large numbers of sensors and different levels of security are involved. Accordingly, a need exists for better methods of expediting such processes.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

Figure 1:
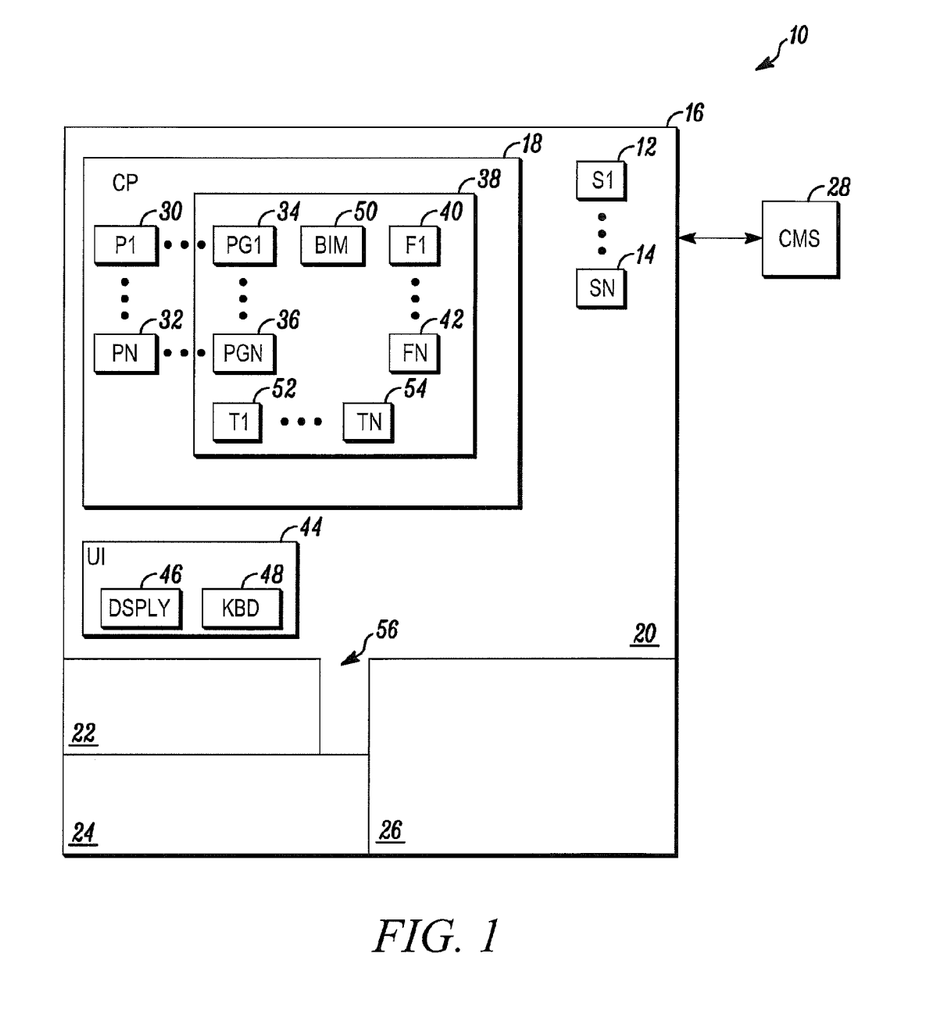
FIG. 1 illustrates a block diagram of a security system in accordance herewith.

FIG. 1 illustrates a simplified block diagram of a security system 10 shown generally in accordance with an illustrated embodiment. Included within the security system is a number of sensors 12, 14 that detect threats within a secured area 16.

The secured area may be divided into a number of different security zones 20, 22, 24, 26. One of the security zones (e.g., security zone 20) may be a default level representing a lowest relative level of security and that covers the entire region of the secured area 16. Other zones (e.g., zones 22, 24, 26) may require different, higher levels of security. In this regard, the lower level of security may only require a basic level of authentication in order for authorized persons to enter the area (e.g., an access card). Other, higher levels of security may require additional levels of authentication. Additional levels of authentication may mean entry of a personal identification number (PINs) and/or verification of a biologic parameter (e.g., fingerprint scans, iris scan, etc.) in addition to an access card.

The sensors may be embodied in any of a number of different forms appropriate for the detection of threats. For example, at least some of the sensors may be limit switches placed on one or more of the doors or windows providing entry into or egress from the secured area.

Alternatively, the sensors may include one or more passive infrared (PIR) detectors that detect intruders who have been able to overcome the physical barrier (e.g., walls, fence, etc.) surrounding the secured area or any of its zones. The PIR sensors may be placed proximate the doors or windows providing entry into the secured area or anywhere within the interior of the secured area.

Alternatively, the sensors may be embodied as one or more security cameras. The security cameras may include motion detection capabilities.

The sensors may also be embodied as one or more card readers for reading access cards, keypads and/or biometric scanners that scan a physical parameter of a person (e.g., fingerprints, iris, etc.). The card readers may be placed outside the secured area and/or proximate an entrance to any of the zones. To enter the secured area, an authorized user may present an access card to the scanner. Upon authentication of the authorized user, the card reader may electrically activate a lock on a door provide access into the secured area.

The biometric readers may be used alone or in combination with a card reader. For example, where a person is attempting to enter an area of a higher level of security from an area with a lower level of security, then only a biometric scan may be needed to authenticate a user for entry from the lower level into the higher level of security. On the other hand, if the door were to provide direct entry from outside the secured area into a zone with a higher level of security, then a card reader and a keypad or biometric reader may be used in combination with a card reader.

The security system may include a control panel 18 that monitors the sensors. The control panel may be located within the secured area, as shown in FIG. 1, or located elsewhere.

Included within the control panel may be one or more processor apparatus (programmed processors) 30, 32, each operating under control of one or more computer programs 34, 36 loaded from a non-transitory computer readable medium (memory) 38). As used herein, reference performed by a step of a computer program is also reference to the processor that executed that step.

For example, an alarm processor may monitor the sensors that detect intruders within the secured area. Upon detecting activation by one of the sensors, the alarm processor or related processor may compose and send an alarm message to a central monitoring station 28. The central monitoring station may respond by summoning the police.

Alternatively, an access processor of the control panel may monitor each of the card readers, keypads and biometric readers located proximate entry portals (doors) into each of the secured areas. Upon detecting indicia of identity appropriate for the zone into which entry is sought, the access processor may activate an electric lock providing access into that zone.

Included within the memory of the control panel may be a respective file 40, 42 associated with each zone of the secured area. The files may include an identifier of the zone, a criteria for entering the zone, a list of people allowed into the area and identification data for each person. In the case of a zone requiring an access card, the data of each person may simply include identification data that is read from the access card of the person. The authentication may simply be a unique code or it may also include a coded image of the authorized person. If the zone has an elevated level of security requiring a PIN, then the file may also include the PIN of the authorized user. Similarly, if the zone requires a biometric parameter, then the file may include a representation of the corresponding biometric parameter.

Upon presentation of an access card to a card reader for entry into a zone, the access processor may compare the data read from the access card with the corresponding data of people authorized for entry into the zone. If a PIN or biometric parameter is required, then the processor may prompt the person to provide the requested information. If the information from the card and PIN and/or biometric information read from the entry point both match the information of an authorized user, then the processor may activate the lock providing access into the zone.

The secured area may be defined by a building information model (BIM) embodied as a file 50 saved within memory. The BIM may define the secured area and each of the zones as a set of geographic coordinates. For example, the location of each physical barrier (e.g., fence, wall, partition, etc.) may be defined by a range of geographic coordinates or a geographic coordinate and a set of offsets from the geographic coordinates. In the case of a secured area including one or more buildings, the coordinates of each building may include a three-dimensional (3D) coordinate system that defines the location of each of the walls, entrances, different floors and the location of each sensor within that building. The BIM may also include one or more descriptors that provide an indication of the physical capabilities of each barrier or partition that separates the zones, how the barrier may be removed and any access openings present within the barrier. For example, if the barrier includes a glass window, then the BIM may include an indicator of the impact resistance of that window. Similarly, the BIM may include the geographic coordinates of each hallway within the secured area as well as the periphery of each security zone.

Following the initial activation of the system, a user or other authorized person may use a user interface 44 to enter a list of authorized persons for each security zone and the security level of each zone. As an identifier of each person is entered through a keyboard 48, the user may confirm the accuracy of the information through a display 46. In the case of each zone having a different level of security, the user may user may enter any additional authentication requirements.

The user may also distribute a unique access card to each person authorized to use the secured area. The access card may include an identifier of the person.

The access card may provide access into the lowest level security zone of the secured area by presentation of the card to a card reader. People authorized to enter zones with an elevated level of security may present the access card to the card reader that provides access into the higher security zone and be prompted to enter a PIN or biometric parameter. During the initial use, it may be assumed that the card is in possession of the authorized user. As a result, the PIN received through the keypad or biometric parameter received through the biometric reader may be saved to the file 40, 42 as a valid indicator of the authorized user. Thereafter any subsequent entry of the PIN or receipt of a biometric parameter from the user will be compared with the contents of the file 40, 42. If a match is found, then access is allowed.

The security system also includes a security analysis system 100 (FIG. 2) including one or more processors that detect weaknesses within the security system. As used herein, a security weakness is any physical or logical flaw in the security system or its physical components based upon the use of different security levels. The security weaknesses may be embodied as any one or more of a number of different defects of the security system (e.g., a lack of physical strength of dividers among portions or zones of the secured area, as walkways or corridors that lead only to a portion with a different level of security, as a mismatch between total authorized users of the secured area and the number of authorized users within a portion with a higher relative level of security, access contradictions, etc.).

Figure 2:
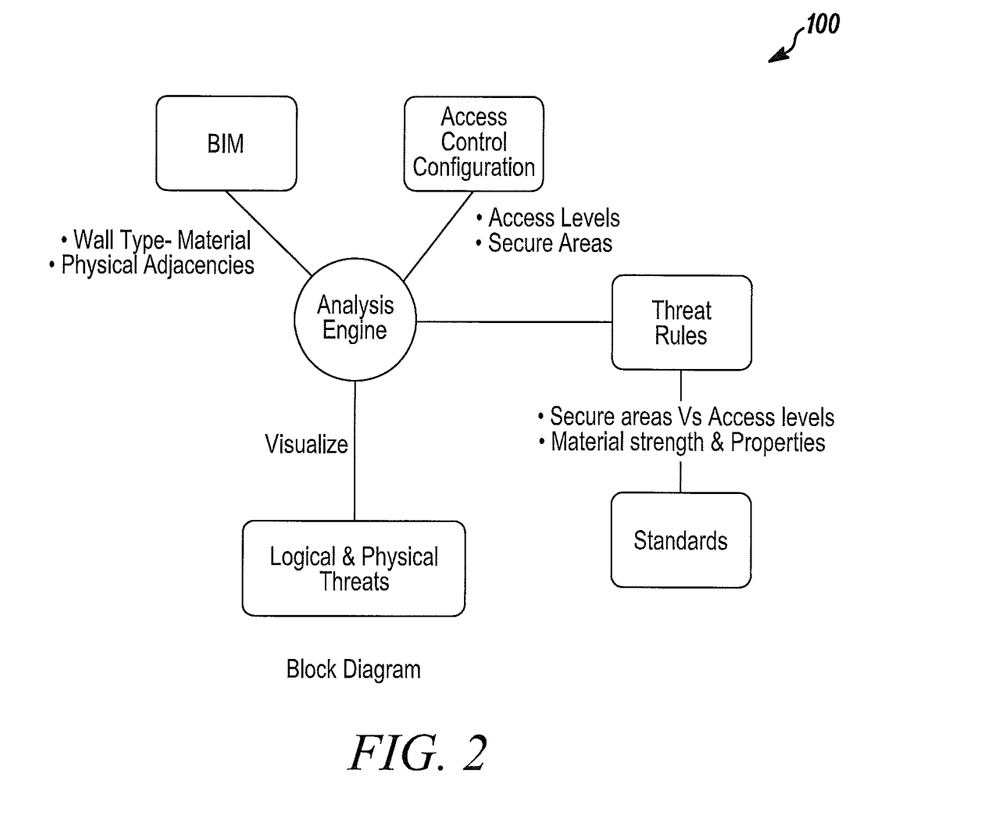
FIG. 2 is a block diagram of a security analysis system of the security system of FIG. 1.

FIG. 2 is a simplified block diagram of the security analysis system shown generally in accordance with an illustrated embodiment. Under the illustrated embodiment, an analysis engine may access a number of different resources (e.g., the BIM file, access control configurations of the different security zones, threat rules, etc.) to identify potential threats. Any identified threats may be visualized on the display as a prompt for the benefit of a user.

Figure 3:
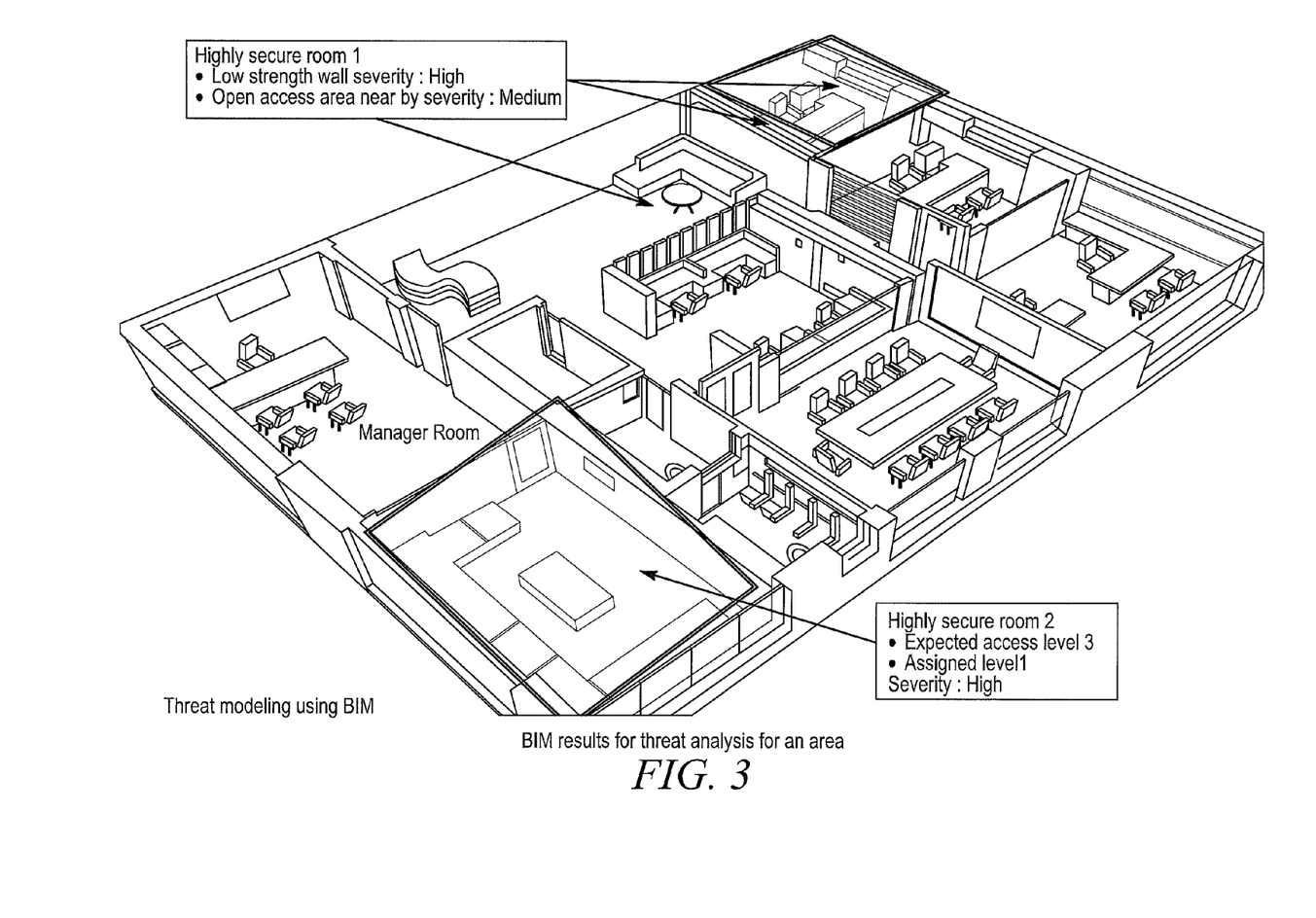
FIG. 3 is an overview of threat modeling under the system of FIG. 2.

FIG. 3 depicts an overview of the modeling performed by the security analysis system. As noted, a first step may be to identify zones within the secured area having different levels of security. Based upon the different levels of security, a number of rules and standards may be retrieved for each zone from the rules resource. For example, one rule may require that highly secured rooms have a minimum level of physical strength based upon the level of security in adjacent zones. In this regard, open access areas of low security near a high security level may result in a number of medium security flags being set that require the application of other security rules. Similarly, the existence of a low strength wall separating the high security area from the low security area may set a high security flag.

Similarly, areas that can only be accessed through elevated security areas may be flagged for further processing. For example, a room that may only be accessed through high security areas may also be modeled as a highly secured room. If the access control configuration resource indicates a low security level for the room, then the room may be flagged with a high security indicator for further processing.

Figure 4:
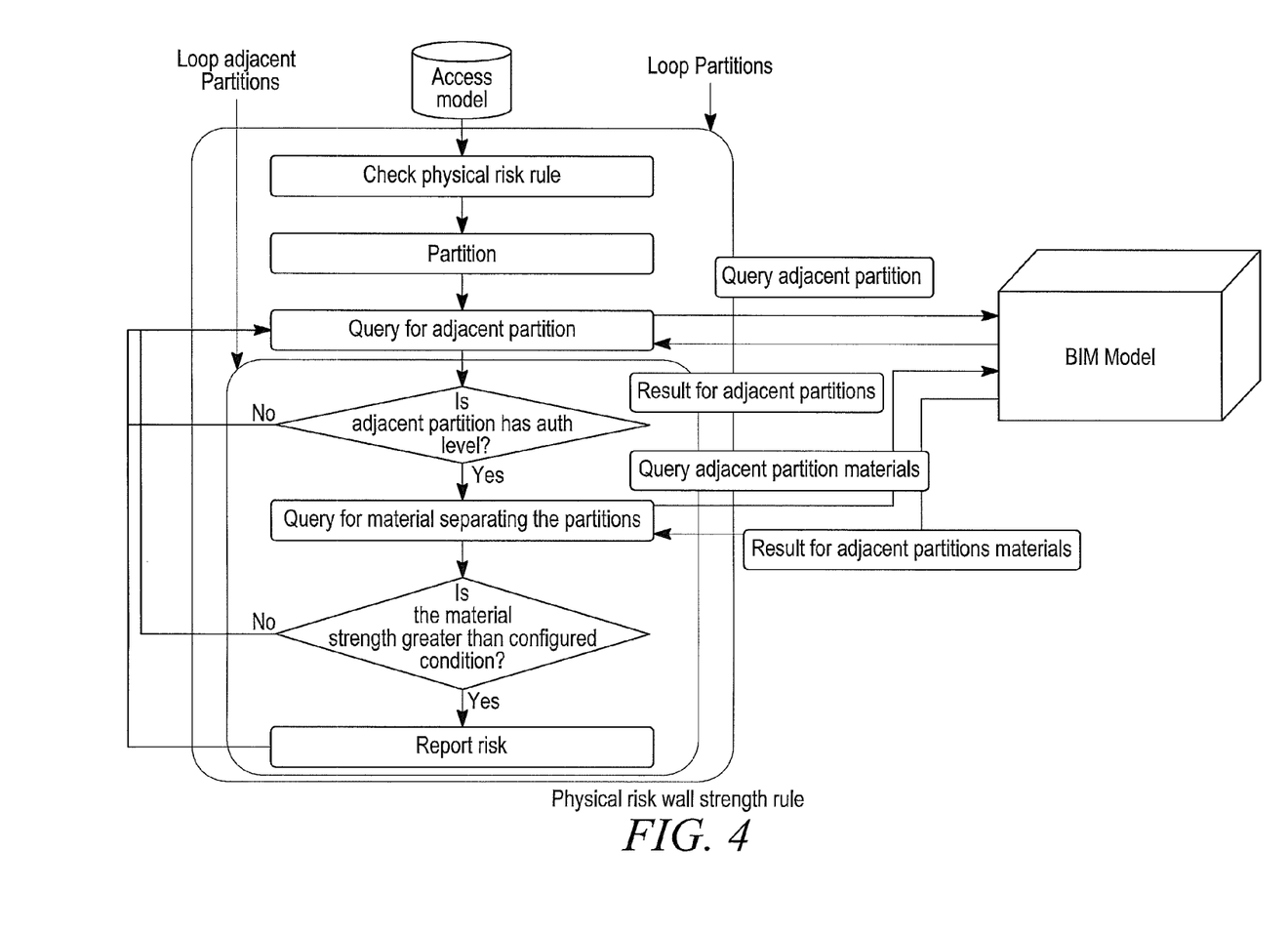
FIG. 4 is a physical risk wall strength rule used by the system of FIG. 2.

In general, the analysis engine of the security analysis system may include a number of different processors that detect weaknesses by comparing the setup of the security system with the physical layout of the secured area (as defined by the BIM). For example, FIG. 4 depicts a set of steps that may be performed in the case of a check physical risk rule.

In this regard, the security analysis system may include a first processor that identifies or simply retrieves previously identified zones with different levels of security. The zones may be correlated with the information from the BIM file via the geographic coordinates of each zone. Information about each of the partitions between a zone and another zone may be analyzed separately. As each partition is analyzed, the processor may query for adjacent partitions. As each partition is identified, the processor determines if the adjacent area requires a lower (or higher) authorization for entry. If so, then the processor queries or otherwise retrieves an identification of the materials separating the security levels. Once the materials have been identified, the processor queries or otherwise determines if the physical strength of the partition is greater than that required for the configured condition. If it is not, then the processor reports the deficiency as a security risk.

For example, once the dividing lines between security zones have been identified, a threat processor may retrieve material information from the BIM file in order to evaluate the threat of penetration by an unauthorized intruder into the zone by comparing the physical characteristics of the physical barrier (e.g., wall) dividing those security zones based upon one or more threshold values retrieved from a set of threshold files 52, 54. For example, if different security zones within the secured area are divided by glass windows, then the threat processor may retrieve an impact rating of the glass of the glass windows and compare the impact rating with glass impact threshold values within the threshold files. If the rating of any window does not meet the required threshold for that security level difference, then the threat processor may display a threat indicator to a user. The threat indicator may include a map of the secured area identifying the location of the threat and the type of threat (e.g., inadequate impact resistance of a glass divider or partition between security zones).

Figure 5:
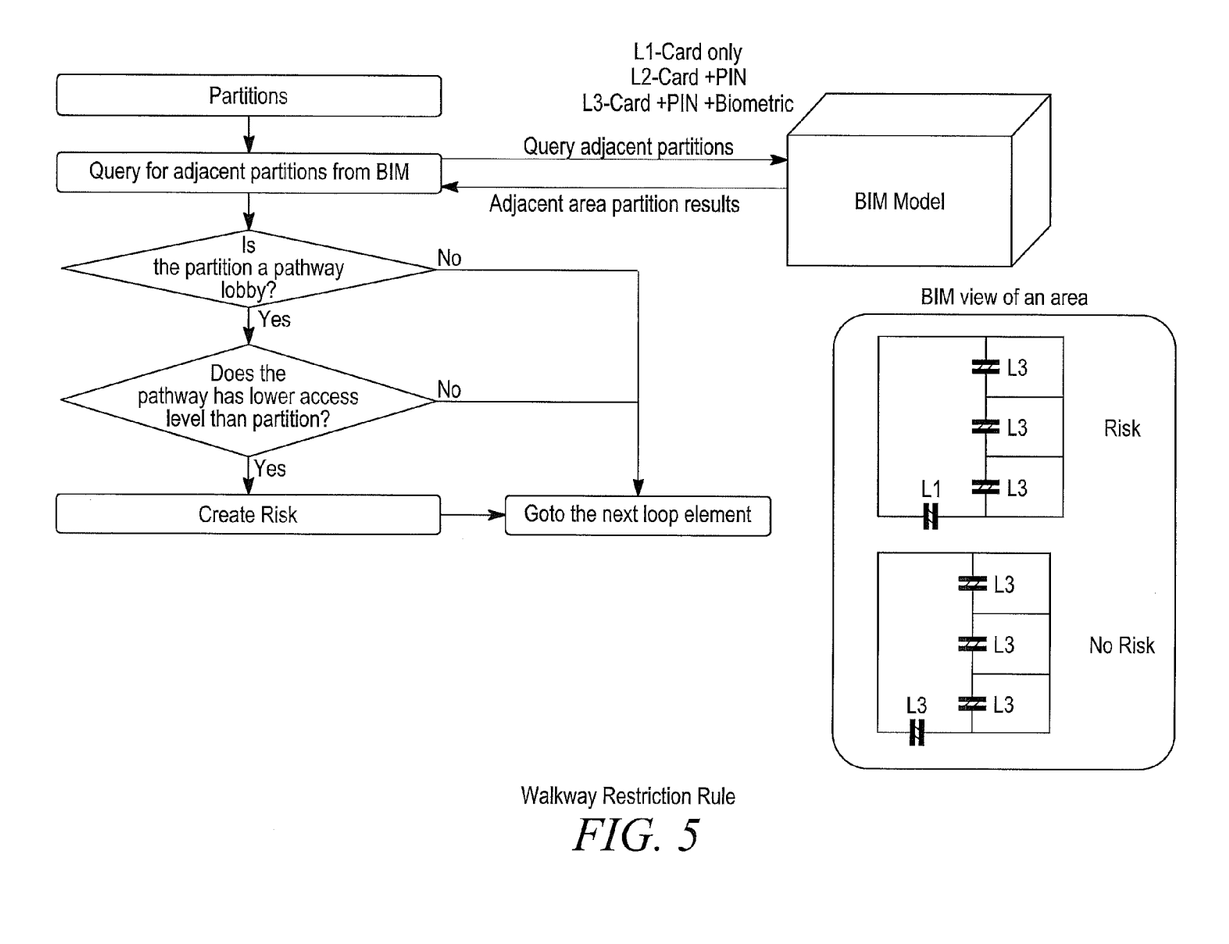
FIG. 5 is a walkway restriction rule used by the system of FIG. 2.

Alternatively, the same or a different threat processor may analyze the boundaries of the security zones for inappropriate security ratings. For example, FIG. 5 depicts a subset of rules that may be activated via the partitions rules. The process of FIG. 5 may be performed concurrently with the process of FIG. 4 or in addition to FIG. 4. In this regard, the processor may identify each partition between zones and determine if the partition separates the security zone from a pathway leading to a lobby. If so, then does the pathway have a lower level of security than the room on the other side of the partition. If so, then the processor identifies the potential risk to the user via an alert and proceeds to the next partition of the loop. Alternatively, if a hallway 56 is included within a first security zone 20, but only leads to areas of higher security (i.e., zones 22, 24, 26), then the threat processor may also present an alert to the user. In this case, the alert may include a map showing the hallway and a prompt notifying the user that the hallway has an inappropriate security rating based upon the ratings of adjacent areas.

Figure 6:
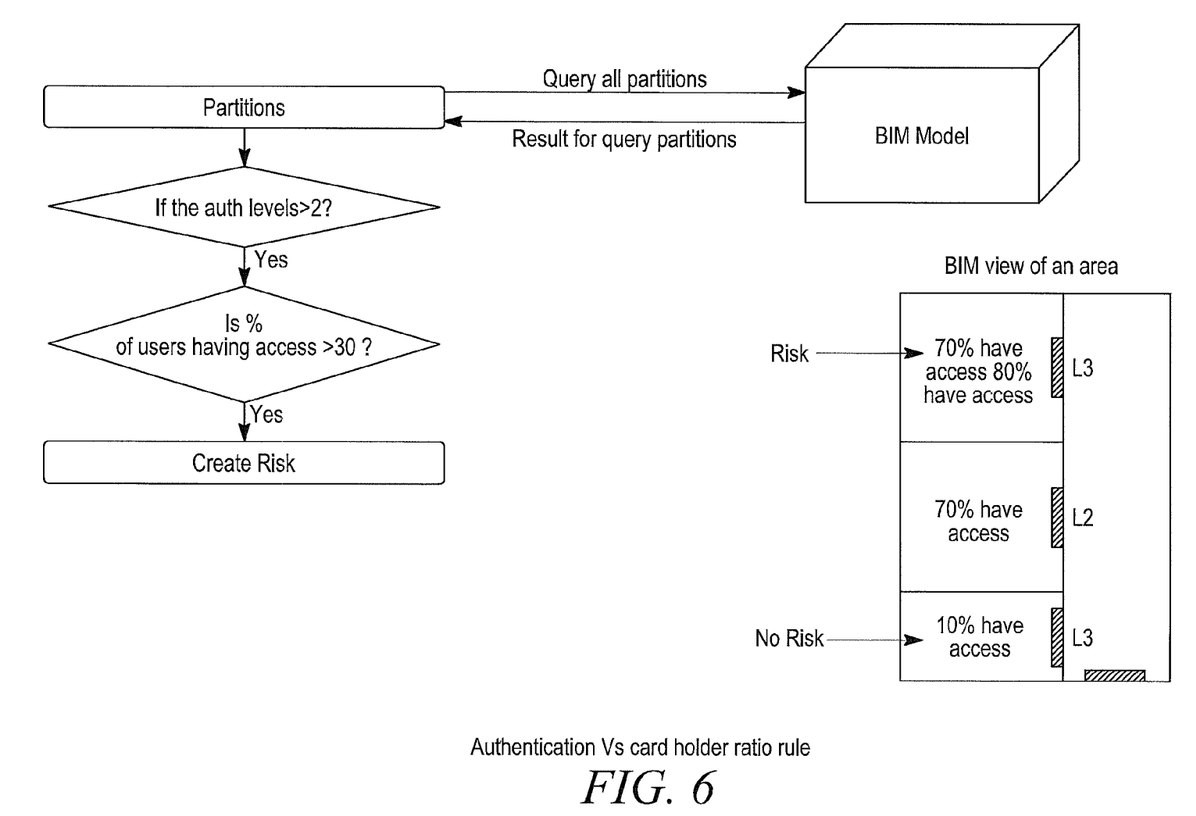
FIG. 6 is a authentication versus card holder ratio rule used by the system of FIG. 2.

FIG. 6 depicts another process implemented by the same or similar processor. In FIG. 6, the processor first identifies the areas of different security and then retrieves the respective lists of people having access to each of those areas. As a first step, the processor may determine that the number of security zones within the secured area is greater than two. Next, the processor may determine the number of people or percent of people who have access to the zone of higher security. The number or percent may be compared with a threshold level (e.g., 30%). If the number or percent is greater than the threshold value, then the processor creates and sends a notification to the user of a potential security risk. In this case, the processor may suggest mitigation actions, such as reducing the number of persons given access to the area or changing the security rating for the zone.

In general, access control systems play a vital role in securing different regions inside a building. They restrict accessibility by requiring authentication and authorization. There are often certain areas inside the building that need extra levels of security for access because of the value of the assets inside that area. Usually such high security areas need to be accessible by only a few people. In addition to card readers, additional mechanisms for receiving secret PINs or biometric parameters (e.g., iris, fingerprint, etc.) may be required.

With current systems, the user has to manually assess the possible threats to high security areas during setup. In the access control software of traditional systems, system administrators must configure higher authentication levels (e.g., access card plus PIN, access card plus biometric, etc.) for the doors/readers which lead to the high security areas. In the case of larger buildings with many doors, the system administrator may miss some high security levels or areas.

In addition, many buildings have weak partitions (e.g., glass, plywood, etc.) that are easily broken. These areas are difficult for an administrator to identify during configuration of the security system.

The system of FIG. 1 identifies potential threats by comparing information from the building information model (BIM) with access control information. These threats can be (for example): 1) a weak wall adjacent a highly secure area; 2) an open corridor leading to a high security area; 3) a low level authentication assigned to a high security area, etc. The proposed system analyzes the configuration of doors and access levels and displays the possible logical and physical threats to a user responsible for the high security areas. The system categorizes the identified threats as low, medium or high based on the severity of the threat. Additionally, the system suggests mitigation actions for those threats.

The system of FIG. 1 has an analysis engine that reads the access control configuration of each zone and takes inputs from the BIM to assess threats. The system executes a set of rules and produces a list of threats. Each rule takes certain parameters and applies pre-defined conditions to the parameters and when the conditions fail, a threat is reported. This is shown in the figures.

At least one of the rules is a physical risk wall strength rule. Under this rules, a wall section made of weak materials, such as cardboard, glass, etc., between highly secure areas and open areas (where anyone with low-level security clearance can access) is treated as a threat (e.g., see FIG. 4).

Another of the rules may be a walkway restriction rule. Under this rule, if there is a walkway/corridor which leads to rooms of a higher relative level of security, and if there is someone who can access the corridor, but doesn't have access to any of the rooms, then that situation is treated as a threat (e.g., see FIG. 5).

Another of the rules may be an authentication versus card holder ratio rule. Under this rule, the total percentage of people having access to each highly secure area is compared with a threshold value, because highly secure areas should have a lower percentage of access rights when compared to other locations. There should be distinct differences in the number of people, who have access to the highly secure areas and those not having access to the highly secure areas.

Let's say that only 5% of the total number of the people who have access to the secured area in general should have access to each of the higher security zones at any given time. If the system administrator tries to provide access into one or more of the high security zones by more than 5% of the people by mistake, then this rule will cause the system to notify the user of this action as a threat (e.g., see FIG. 6).

Another of the rules may be an authentication contradiction rule. Under this rules, a contradiction may flag a risk. For example, assume that there are two doors with different authentication levels (e.g., level 1, level 2, level 3) that all lead into a single room. In this case, the threat processor may identify all entrances into a single zone, compare the security level of each card, PIN and/or biometric reader to ensure that they all require the same indicia of authenticity. If they do not, the processor generates an alert of the user.

Another set of rules may form a portion of the authentication contradiction rule. In this case, the rule may form a group access contradiction rule. In this case, the processor may determine if there is any access control system requirements defined by the user for a particular region that are in contradiction. For example, assume that there are two rules: one rule allows a group of people into a location and another rule restricts another group of people from that location. If there is a person who is present in both groups, etc., such configuration will be treated as a threat.

Another set of rules may form a redundancy rule. Under this rule, if there are any redundant configuration rules that give access for the same set of people to the same set of locations, then the user is notified.

In general, the solution offered by the system of FIG. 1 automatically identifies any of a number of possible physical/logical threats in buildings and the actions that should be taken that would, otherwise, be impossible for the system administrator to explicitly or easily identify. Using the system described herein, the system administrator can easily determine if all of the highly secured areas are properly configured. In this regard, predefined rules tend to eliminate frequently occurring human errors.

The system of FIG. 1 can be used in any of a number of different circumstances and locations. For example the system can be used in buildings for the initial commissioning and configuration of the access control system or when there is any need for modification. The system can be used to suggest alternative access control configurations in buildings so that the secured areas are guarded properly. The system can also be used to assess the threats in buildings with preexisting access control systems. The system may also be of considerably value in the case of large industrial areas, multistory commercial/residential buildings and shopping malls, which may have a large number of rooms or doors.

In general, the system includes a building information model (BIM) of a secured area having a plurality of different portions, the BIM embodied in a memory, a processor that identifies portions of the secured area having different levels of security and a processor that alerts a user of a security weakness based upon an interaction between the security levels and physical characteristics of the secured area defined by the BIM.

Alternatively, the system includes a security system having a secured area with a number of different portions each with a different security level, a building information model (BIM) of the secured area embodied in a memory of the security system, an analysis engine of the security system that identifies the portions of the secured area having different levels of security and a respective partition between the portions having the different levels of security, a processor of the analysis engine that analyzes a context of each partition and compares the context with a respective rule of a plurality of rules related to the context and a processor that alerts a user of a security weakness based upon an interaction between the security levels and physical characteristics of the secured area defined by the BIM.

Alternatively, the system may include a security system, a building information model (BIM) of a secured area having a plurality of different portions, the BIM embodied in a memory of the security system, a plurality of rules defining a minimum level of security for each of the plurality of different portions, an analysis engine of the security system that identifies portions of the secured area having different levels of security and at least one respective rule of the plurality of rules that applies to a partition between the portions having the different levels of security, a processor of the analysis engine that analyzes a context of each partition and compares the context with the at least one respective rule of the plurality of rules related to the context and a processor that alerts a user of a security weakness based upon an interaction between the security levels and at least one respective rule of the secured area.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:
1. An apparatus comprising:
a building information model (BIM) of a secured area having a plurality of different portions, wherein the BIM is embodied in a memory; and
a processor that identifies different ones of the plurality of different portions of the secured area having different levels of security by referencing the BIM,
wherein the processor notifies a user about a security weakness based upon an interaction between the different levels of the security of the different ones of the plurality of different portions of the secured area defined by the BIM and physical characteristics of the different ones of the plurality of different portions of the secured area defined by the BIM, and
wherein the security weakness comprises at least a set of categories that includes: dividers among the different ones of the plurality of different portions of the secured area having the different levels of the security having both a physical material strength and an impact strength below a predetermined threshold, walkways or corridors that lead only from a first one of the plurality of different portions of the secured area having a first one of the different levels of the security to a second one of the plurality of different portions of the secured area having a second one of the different levels of the security, and a mismatch between total authorized users of the secured area and a number of authorized users within a selected one of the plurality of different portions of the secured area with a higher relative one of the different levels of the security.

2. The apparatus as in claim 1 wherein the processor compares an impact resistance of a window separating two portions of the plurality of different portions of the secured area with a threshold minimum impact level.

3. The apparatus as in claim 1 wherein the processor identifies an absence of or easily removable dividers separating two portions of the plurality of different portions of the secured area having the different levels of security.

4. The apparatus as in claim 1 wherein the processor detects that the number of the authorized users within the selected one of the plurality of different portions of the secured area with the higher relative one of the different levels of the security is equal to or greater than a number of the authorized users in adjoining ones of the plurality of different portions of the secured area.

5. The apparatus as in claim 1 wherein the processor detects that the number of the authorized users with the selected one of the plurality of different portions of the secured area with the higher relative one of the different levels of the security is equal to or greater than a predetermined threshold or percentage of a number of the authorized users in adjoining ones of the plurality of different portions of the secured area.

6. The apparatus as in claim 1 wherein the processor detects the authorized users that are members of both a first group of the authorized users that are only allowed into an identified one of the plurality of different portions of the secured area and a second group of the authorized users that are excluded from the identified one of the plurality of different portions of the secured area.

7. The apparatus as in claim 1 wherein the processor determines an access criterion for each of the plurality of different portions of the secured area.

8. The apparatus as in claim 7 wherein the access criterion for a lowest relative one of the different levels of the security comprises presentation of a valid access card.

9. The apparatus as in claim 8 wherein the access criterion for a higher one of the different levels of the security above the lowest relative one of the different levels of the security comprises an access card and one or more of a personal identification number and a biometric parameter read by a biometric reader.

10. An apparatus comprising:
a security system having a secured area with a number of different portions, wherein each one of the number of different portions includes a respective security level;
a building information model (BIM) of the secured area embodied in a memory of the security system;
an analysis engine of the security system that identifies different ones of the number of different portions of the secured area having different ones of the respective security level by referencing the BIM and a respective partition between the different ones of the number of different portions of the secured area having the different ones of the respective security levels; and
a processor of the analysis engine that analyzes a context of the respective partition between each of the different ones of the number of different portions of the secured area having the different ones of the respective security levels and compares the context with a respective rule of a plurality of rules related to the context,
wherein the processor alerts a user about a security weakness based upon an interaction between the different ones of the respective security levels of the different ones of the number of different portions of the secured area defined by the BIM and physical characteristics of the different ones of the number of different portions of the secured area defined by the BIM, and
wherein the security weakness comprises at least a set of categories that includes: dividers among the different ones of the number of different portions of the secured area having the different ones of the respective security levels having both a physical material strength and an impact strength below a predetermined threshold, walkways or corridors that lead only from a first one of the number of different portions of the secured area with a first one of the respective security levels to a second one of the number of different portions of the secured area having a second one of the respective security levels, and a mismatch between total authorized users of the secured area and a number of the authorized users within a selected one of the number of different portions of the secured area with a higher relative one of the respective security levels.

11. The apparatus as in claim 10 wherein the processor displays a map showing a location of the security weakness.

12. The apparatus as in claim 10 wherein the processor prompts the user with a correction for the security weakness.

13. The apparatus as in claim 10 wherein the processor detects that the number of the authorized users within the selected one of the number of different portions of the secured area with the higher relative one of the respective security levels is equal to or greater than a number of authorized users in adjoining ones of the number of different portions of the secured area.

14. The apparatus as in claim 10 wherein the processor detects that the number of the authorized users within the selected one of the number of different portions of the secured area with the higher relative one of the respective security levels is equal to or greater than a predetermined threshold or percentage of a number of the authorized users in adjoining ones of the number of different portions of the secured area.

15. The apparatus as in claim 10 wherein the processor detects the authorized users that are members of both a first group of the authorized users that are only allowed into an identified one of the number of different portions of the secured area and a second group of the authorized users that are excluded from the identified one of the number of different portions of the secured area.

16. The apparatus as in claim 10 wherein the processor determines an access criterion for each of the number of different portions of the secured area.

17. An apparatus comprising:
a security system;
a building information model (BIM) of a secured area having a plurality of different portions, wherein the BIM is embodied in a memory of the security system;
a plurality of rules defining a minimum level of security for each of the plurality of different portions;
an analysis engine of the security system that identifies different ones of the plurality of different portions of the secured area having different levels of security by referencing the BIM and a rule of the plurality of rules that applies to a partition between the different ones of the plurality of different portions of the secured area having the different levels of the security; and
a processor of the analysis engine that analyzes a context of the partition between the different ones of the plurality of different portions of the secured area and compares the context with the rule of the plurality of rules related to the context, wherein the processor alerts a user about a security weakness based upon an interaction between the different levels of the security of the different ones of the plurality of different portions of the secured area and the plurality of rules, and wherein the security weakness comprises at least a set of categories that includes: dividers among the different ones of the plurality of different portions of the secured area having the different levels of the security having both a physical material strength and an impact strength below a predetermined threshold, walkways or corridors that lead only from a first one of the plurality of different portions of the secured area having a first one of the different levels of the security to a second one of the plurality of different portions of the secured area having a second one of the different levels of the security, and a mismatch between total authorized users of the secured area and a number of the authorized users within an identified one of the plurality of different portions of the secured area with a higher relative one of the different levels of the security and access contradictions.

* * * * *